United States Patent
Jin et al.

(10) Patent No.: US 11,696,290 B2
(45) Date of Patent: *Jul. 4, 2023

(54) APPLICATION INSTANCE ADDRESS TRANSLATION METHOD AND APPARATUS

(71) Applicant: HUAWEI TECHNOLOGIES CO., LTD., Guangdong (CN)

(72) Inventors: Aijin Jin, Shenzhen (CN); Fengyu Zhang, Shanghai (CN); Yan Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/493,580

(22) Filed: Oct. 4, 2021

(65) Prior Publication Data

US 2022/0030585 A1    Jan. 27, 2022

Related U.S. Application Data

(63) Continuation of application No. 16/710,449, filed on Dec. 11, 2019, now Pat. No. 11,140,665, which is a (Continued)

(30) Foreign Application Priority Data

Jun. 30, 2017    (CN) .......................... 201710530099.X

(51) Int. Cl.
*H04W 72/04*    (2023.01)
*H04W 36/00*    (2009.01)
(Continued)

(52) U.S. Cl.
CPC ............ *H04W 72/21* (2023.01); *H04L 45/74* (2013.01); *H04L 61/2503* (2013.01); *H04W 36/0033* (2013.01); *H04W 72/23* (2023.01)

(58) Field of Classification Search
None
See application file for complete search history.

(56) References Cited

U.S. PATENT DOCUMENTS

2012/0314689 A1    12/2012    Wang
2015/0271725 A1    9/2015    Lee et al.
(Continued)

FOREIGN PATENT DOCUMENTS

CN    102170667    8/2011
CN    105656992    6/2016
(Continued)

OTHER PUBLICATIONS

Huawei, "Key issue update: Support of applications hosting within the network," SA WG2 Meeting #114, S2-161635, Sophia Antipolis, France, Apr. 11-15, 2016, 5 pages.
(Continued)

*Primary Examiner* — Saba Tsegaye
(74) *Attorney, Agent, or Firm* — Fish & Richardson P.C.

(57) ABSTRACT

This application discloses example application instance address translation methods. One example method includes receiving, by a control plane device from a mobile edge cloud control device, an address of a target application instance of an application service accessed by a terminal. The control plane device can then send the address of the target application instance to a first user plane device. The control plane device can then instruct the first user plane device to set, as the address of the target application instance, a destination address of an uplink packet that is of the terminal and is associated with the application service.

20 Claims, 8 Drawing Sheets

Related U.S. Application Data continuation of application No. PCT/CN2018/087860, filed on May 22, 2018.

(51) Int. Cl.
*H04W 72/21* (2023.01)
*H04L 45/74* (2022.01)
*H04L 61/2503* (2022.01)
*H04W 72/23* (2023.01)

(56) References Cited

U.S. PATENT DOCUMENTS

| | | |
|---|---|---|
| 2017/0070436 A1 | 3/2017 | Lubenski et al. |
| 2018/0242204 A1 | 8/2018 | Zhu et al. |
| 2018/0249389 A1 | 8/2018 | Zhu et al. |
| 2018/0295098 A1 | 10/2018 | Yuzawa |
| 2019/0020657 A1* | 1/2019 | Egner ............... H04W 12/009 |
| 2019/0058767 A1 | 2/2019 | Chandramouli et al. |
| 2019/0380028 A1 | 12/2019 | Rasanen |
| 2020/0229206 A1* | 7/2020 | Badic ................. H04W 40/22 |

FOREIGN PATENT DOCUMENTS

| | | |
|---|---|---|
| CN | 106231607 | 12/2016 |
| CN | 106304228 | 1/2017 |
| CN | 106470449 A | 3/2017 |
| CN | 106900031 A | 6/2017 |
| KR | 20150110103 A | 10/2015 |
| WO | 2017066945 | 4/2017 |
| WO | 2017070895 | 5/2017 |

OTHER PUBLICATIONS

Office Action issued in Chinese Application No. 202110328826.0 dated Dec. 28, 2021, 7 pages.
"Mobile Edge Computing (MEC); End to End Mobility Aspects", ETSI Draft Specification, Jun. 23, 2017, pp. 1-53, XP014322883 (53 pages).
ETSI, "Mobile Computing Edge (MEG) and Reference Architecture Framework", ETSI GS MEG 003 V1.1.1 (Mar. 2016), Mar. 31, 2016. total 18 pages.
Extended Search Report dated Apr. 20, 2020, issued in counterpart Application No. 18823492.6 (15 pages).
Fabio Giust: NEC Europe Ltd: "MEC Mobility Management;MEC(I5)000165_MEC_mobility management," Jul. 14, 2015, pp. 1-10, XP014250180 (10 pages).
International Search Report dated Aug. 14, 2018, issued in counterpart application No. PCT/CN2018/087860, with English translation. (13 pages).
Office Action dated Mar. 13, 2020, issued in counterpart CN application No. 201710530099.X, with English translation. (15 pages).
Tarik Taleb et al., "Mobile Edge Computing Potential in Making Cities Smarter", Enabling Mobile and Wireless Technologies for Smart Cities, IEEE Communications Magazine, Mar. 2017. (6 pages).

* cited by examiner

APPLICATION INSTANCE ADDRESS TRANSLATION METHOD AND APPARATUS

CROSS-REFERENCE TO RELATED APPLICATIONS

This application is a continuation of U.S. patent application Ser. No. 16/710,449, filed on Dec. 11, 2019, now U.S. Pat. No. 11,140,665, which is a continuation of International Application No. PCT/CN2018/087860, filed on May 22, 2018, which claims priority to Chinese Patent Application No. 201710530099.X, filed on Jun. 30, 2017. All of the afore-mentioned patent applications are hereby incorporated by reference in their entireties.

TECHNICAL FIELD

This application relates to the communications field, and in particular, to an application instance address translation method and apparatus.

BACKGROUND

A current network (a commercial wireless network 2G/3G/long term evolution (LTE)) is an aggregated network. In a current network, a service does not have a high requirement for a delay, and a terminal accesses a service by using a centralized gateway. For example, a delay of accessing the service by the terminal is approximately 100 ms. With development of a virtualization technology and a distributed cloud technology, in a future mobile network, a micro cloud platform, namely, a mobile edge computing/mobile edge cloud (MEC) platform, is deployed on a network edge (for example, a location near a base station). To meet a low-delay requirement of a future service and reduce network bandwidth resource consumption, a plurality of application instances of the service are respectively deployed on a plurality of MEC platforms in a distributed manner, and each application instance of the service provides a service for the terminal within a specific range. When the terminal moves from a service area of an application instance of the service to another service area, the terminal needs to access an application instance corresponding to another service area.

After the terminal moves, application state transition (application state relocation) of an application instance needs to be performed when the terminal accesses the application instance of another service area. The application state transition includes: application layer user state transition, network connection (socket) transition, and IP Internet Protocol (IP) address and transmission path mobility (IP Mobility) processing. With respect to the IP mobility processing, an existing transition technology is as follows: after the application instance is changed, a user uplink packet needs to be sent to a service device corresponding to a source application instance by using a service device corresponding to a destination application instance. The service device corresponding to the source application instance performs destination network address translation (DNAT) on the packet, then the service device corresponding to the source application instance forwards the packet to the service device corresponding to the target application instance, and the packet is finally forwarded to the target application instance.

A problem of this technology is that an uplink path is roundabout. In particular, after application instances are continuously switched, an uplink packet needs to be first sent to an initial service device, and then forwarded to a destination service device. Consequently, a network delay is relatively high in a terminal transition process, affecting user experience.

SUMMARY

This application provides an application instance address translation method and apparatus, to reduce a network delay when a terminal is moving.

According to a first aspect, this application provides an application instance address translation method, including the following steps.

A control plane device sends, to a mobile edge cloud MEC control device by using a collaboration request, information about an application service accessed by a terminal and a location of the terminal. After obtaining an address of a target instance based on the information about the application service and location information of the terminal, the MEC control device sends the address of the target instance to the control plane device by using a response message.

The control plane device formulates an address translation policy based on the address of the target instance, and sends the policy to first user equipment. The policy is used to instruct the first user plane device to set, as the address of the target instance, a destination forwarding address of an uplink packet sent by the terminal to obtain the application service.

After the terminal moves from one service area to another service area, although an application instance of an accessed application service is changed, the terminal does not sense the change. The terminal may still send the uplink packet by using an address of an application instance connected when the terminal initially accesses the application service. A network side may forward, to the new application instance by using the foregoing address translation method, the uplink packet sent by the terminal. In this case, the terminal may send a packet without establishing a connection to the new application instance. This reduces a network delay.

In a possible implementation, the method may further include the following steps.

The control plane device obtains, based on an address of an application instance currently communicating with the terminal, an initial instance address used when the terminal accesses the application service. The control plane device formulates, based on the obtained initial instance address, an address translation policy for a downlink packet, and sends the policy to the first user equipment. The policy is used to instruct the first user equipment to set, as the initial instance address, a source address of a downlink packet sent by the target instance to the terminal.

A new application instance is used on the network side. Therefore, for a downlink packet sent by the new application instance, the terminal may not be capable of identifying a source address of the downlink packet. The network side needs to set the source address of the downlink packet as the initial instance address used when the terminal accesses the application service. In this way, in a process in which the terminal accesses the application service, the terminal can not only identify the downlink packet sent by the new application instance, but also never sense that the new application instance is used on the network side, and therefore does not need to create a connection to the new application instance. This reduces a network delay.

In a possible implementation, the method may further include the following steps.

The control plane device receives a handover request sent by an original access network (AN) or a target AN, and the handover request is used to request to hand over the terminal from the original AN to the target AN.

The control plane device queries for a user plane device corresponding to the target AN. If the target AN corresponds to a plurality of user plane devices, the control plane device selects at least one user plane device, and sends information about the at least one selected user plane device to the MEC control device by using the collaboration request. The MEC control device determines one user plane device that can be used from the at least one user plane, and determines one user plane device that corresponds to a MEC platform served by the target AN, so as to determine the first user plane device.

Then, the MEC Ctl (centralized control management) sends information about the determined first user plane device to the control plane device by using the response message. The control plane device creates a session between the terminal and the first user plane device.

In this way, the control plane device and the MEC control device cooperatively determine the first user plane device, so that a case, in which the determined user plane device cannot be used because the user plane device is determined by a single network element, is avoided.

According to a second aspect, this application provides an application instance address translation method, including the following steps.

A mobile edge cloud MEC control device receives a collaboration request sent by a control plane device. The collaboration request includes location information of a terminal and information about an application service accessed by the terminal.

The MEC control device determines the MEC platform based on the location information of the terminal, then determines a target instance based on the information about the application service, and obtains an address of the target instance.

The MEC control device sends the obtained address of the target instance to the control plane device by using a response message, so that the control plane device formulates an address translation policy based on the target instance, and instructs the first user plane device to set, as an initial instance address, a source address of a downlink packet sent by the target instance to the terminal.

In a possible implementation, the location information of the terminal includes information about a target access network AN accessed by the terminal.

That the MEC control device determines the target instance based on the location information of the terminal and the information about the application service may be as follows.

The MEC control device determines MEC platforms that are served by the target AN, and then determines a MEC platform, in these MEC platforms, on which the application instance of the application service is deployed, to determine a first MEC platform and the target instance deployed on the first MEC platform.

According to a third aspect, this application provides an application instance address translation method, including the following steps.

A control plane device sends, to a mobile edge cloud MEC control device by using a collaboration request, information about an application service accessed by a terminal and a location of the terminal. After determining a first MEC platform based on the information about the application service and location information of the terminal, the MEC control device sends an identifier of the first MEC platform to the control plane device by using a response message.

After receiving the identifier of the first MEC platform, the control plane device sends a packet forwarding instruction to a first user plane device, to instruct the first user plane device to send, to the first MEC platform, a packet used by the terminal to access the application service, so that the first MEC platform performs address translation on the packet.

In the foregoing method, the MEC platform has an address translation function. The MEC platform can formulate a corresponding address translation policy and perform a corresponding address translation operation. This reduces loads of the control plane device and the user plane device.

In a possible implementation, the response message further includes service flow characteristic information, and the service flow characteristic information is created by the MEC control device based on an address of the terminal, and a service address and an instance address of the application service.

The control plane device further instructs the first user plane device to determine a target packet based on the service flow characteristic information.

According to a fourth aspect, this application provides an application instance address translation method, including the following steps.

A mobile edge cloud MEC control device receives a collaboration request sent by a control plane device, where the collaboration request includes location information of a terminal and information about an application service accessed by the terminal.

The MEC control device determines, based on the location information of the terminal, a first mobile edge cloud MEC platform that provides the application service.

The MEC control device sends an identifier of the determined first MEC platform to the control plane device by using a response message, and instructs the control plane device to control a first user plane device to send, to the first MEC platform, a packet used by the terminal to access the application service, so that the first MEC platform performs address translation on the packet.

In a possible implementation, the method may further include the following steps.

The MEC control device obtains a service address of the application service and an address of a target instance, and creates service flow characteristic information.

The MEC control device sends the created service flow characteristic information to the control plane device by using the response message, and instructs the control plane device to control the first user plane device to determine a target packet based on the service flow characteristic information.

According to a fifth aspect, this application provides an application instance address translation method, including the following steps.

A mobile edge cloud MEC platform receives a packet that is sent by a first user plane device and that is used by a terminal to access an accessed application service.

The MEC platform determines whether the packet is an uplink packet or a downlink packet. If the packet is an uplink packet, the MEC platform sets a destination forwarding address of the packet as an address of an application instance, of the application service, deployed on the MEC platform. If the target packet is a downlink packet, the MEC platform sets a source address of the packet as a service address of a target application service.

An access address obtained when the terminal accesses the application service is a service address of the application service. Therefore, regardless of which serving cell the terminal is in, before an uplink packet used to access the application service is sent to a corresponding application instance, address translation needs to be performed on the uplink packet, and address translation needs to be performed on a downlink packet before the downlink packet is sent to the terminal, so that the terminal can identify the packet. In the foregoing method, the MEC platform performs the address translation. If an application instance of the application service is deployed on the MEC platform, the MEC platform can certainly know the service address of the application service and the address of the application instance. In this way, the MEC platform does not need to obtain another address that needs to be translated, and can directly perform address translation on a local address. This reduces a signaling interworking process, and improves an access speed of the terminal.

In a possible implementation, that the MEC platform receives a packet that is sent by a first user plane device and that is used by a terminal to access an accessed application service may be as follows.

The MEC platform receives, by using a data plane device, the packet that is sent by the first user plane device and that is used by the terminal to access the accessed application service. That is, the packet sent by the first user plane device to the MEC platform may be forwarded by using the data plane device. Correspondingly, a packet sent by the MEC platform to the first user plane device may also be forwarded by using the data plane device.

Before the MEC platform receives, by using the data plane device, the packet that is sent by the first user plane device and that is used by the terminal to access the accessed application service, the method may further include the following steps.

The MEC platform generates a routing rule based on a configured address network segment of the terminal, the service address of the application service, and an address of a target instance. The MEC platform sends the routing rule to the data plane device, and instructs the data plane device to send, to the MEC platform according to the routing rule for address translation, a packet used by the terminal to access the accessed application service.

The address network segment of the terminal is used by the data plane device to identify whether a received packet is sent by the terminal or needs to be sent to the terminal. Because address translation usually does not need to be performed on a packet sent by another device to the MEC platform, in this manner, the foregoing case is avoided.

According to a sixth aspect, this application provides an application instance address translation apparatus, including: a sending unit, configured to send a collaboration request to a mobile edge cloud MEC control device, where the collaboration request includes location information of a terminal and information about an application service, and the application service is an application service accessed by the terminal; a receiving unit, configured to receive response information from the MEC control device, where the response information includes an address of a target instance, and the address of the target instance is associated with the location information of the terminal and the information about the application service, where the sending unit is further configured to send, based on the address of the target instance, the address of the target instance to a first user plane device corresponding to the target instance; and a processing unit, configured to instruct the first user plane device to set, as the address of the target instance, a forwarding address of an uplink packet sent by the terminal to obtain the application service.

According to a seventh aspect, this application provides an application instance address translation apparatus, including: a receiving unit, configured to receive a collaboration request from a control plane device, where the collaboration request includes location information of a terminal and information about an application service, and the application service is an application service accessed by the terminal; a determining unit, configured to determine a target instance of the application service based on the collaboration request; an obtaining unit, configured to obtain an address of the target instance, where the target instance is an application instance that provides the application service and whose service location range includes a location of the terminal; and a sending unit, configured to send response information to the control plane device, where the response information includes the address of the target instance, and the address of the target instance is used for packet address translation.

According to an eighth aspect, this application provides an application instance address translation apparatus, including: a sending unit, configured to send a collaboration request to a mobile edge cloud MEC control device, where the collaboration request includes location information of a terminal and information about an application service, and the application service is an application service accessed by the terminal; a receiving unit, configured to receive response information from the MEC control device, where the response information includes an identifier of a first mobile edge cloud MEC platform, the first MEC platform is a MEC platform that provides the application service, and the identifier of the first MEC platform is associated with the location information of the terminal and the information about the application service, where the sending unit is further configured to send the identifier of the first MEC platform to a first user plane device, and instruct the first user plane device to send a target packet to the first MEC platform, where the target packet is a packet used by the terminal to access the application service; and a processing unit, configured to control the sending unit to perform a sending step, and control the receiving unit to perform a receiving step.

According to a ninth aspect, this application provides an application instance address translation apparatus, including: a receiving unit, configured to receive a collaboration request from a control plane device, where the collaboration request includes location information of a terminal and information about an application service, and the application service is an application service accessed by the terminal; a determining unit, configured to determine an identifier of a first mobile edge cloud MEC platform based on the collaboration request, where the first MEC platform is a MEC platform that provides the application service; a sending unit, configured to send the identifier of the first MEC platform to the control plane device; and a processing unit, configured to instruct the control plane device to control a first user plane device to send a target packet to the first MEC platform, where the target packet is a packet used by the terminal to access the application service.

According to a tenth aspect, this application provides an application instance address translation apparatus, including: a receiving unit, configured to receive a target packet from a first user plane device, where the target packet is a packet used by a terminal to access an application service, and the application service is an application service accessed by the terminal; and a setting unit, configured to: if the target packet is an uplink packet, set a forwarding address of the target packet as an address of a target instance, where the address of the target instance is an address of an application instance, of the application service, deployed on the MEC platform, where the setting unit is alternatively configured to: if the target packet is a downlink packet, set a source address of the target packet as a service address of the target application service.

According to an eleventh aspect, this application provides an application instance address translation apparatus, including: a processor, a memory, and a transceiver, where the processor, the memory, and the transceiver are connected by using a bus, the memory stores a computer instruction, and the processor executes the computer instruction to implement the method according to any one of the first aspect, the second aspect, the third aspect, the fourth aspect, or the fifth aspect.

According to a twelfth aspect, this application provides a storage medium. The storage medium provides a computer instruction that can be used to implement the method according to any one of the first aspect, the second aspect, the third aspect, the fourth aspect, or the fifth aspect.

According to a thirteenth aspect, this application provides a computer program product, and the computer program product includes a computer software instruction. The computer program product may be loaded by a processor to implement a process of the method according to any one of the first aspect, the second aspect, the third aspect, the fourth aspect, or the fifth aspect.

According to a fourteenth aspect, this application provides a chip system. The chip system includes a processor, configured to support an application instance address translation apparatus in implementing the functions in the foregoing aspect, for example, generating or processing information in the foregoing methods. In a possible design, the chip system further includes a memory. The memory is configured to store a program instruction and data necessary for the application instance address translation apparatus. The chip system may include a chip, or may include a chip and another discrete component.

It can be learned from the foregoing technical solutions that this application provides the following advantages.

When sending an uplink packet, a terminal side needs to perform sending only based on an address of an original instance. When the uplink packet arrives at a user plane device, the user plane device forwards the uplink packet to a target instance of an application service. In this case, after performing cross-access node service area movement, the terminal can directly perform packet exchange without recreating a service connection to a new application instance. This reduces a network delay.

DESCRIPTION OF EMBODIMENTS

Embodiments of this application provide an application instance address translation method and apparatus, to reduce a network delay when a terminal is moving.

Figure 1:
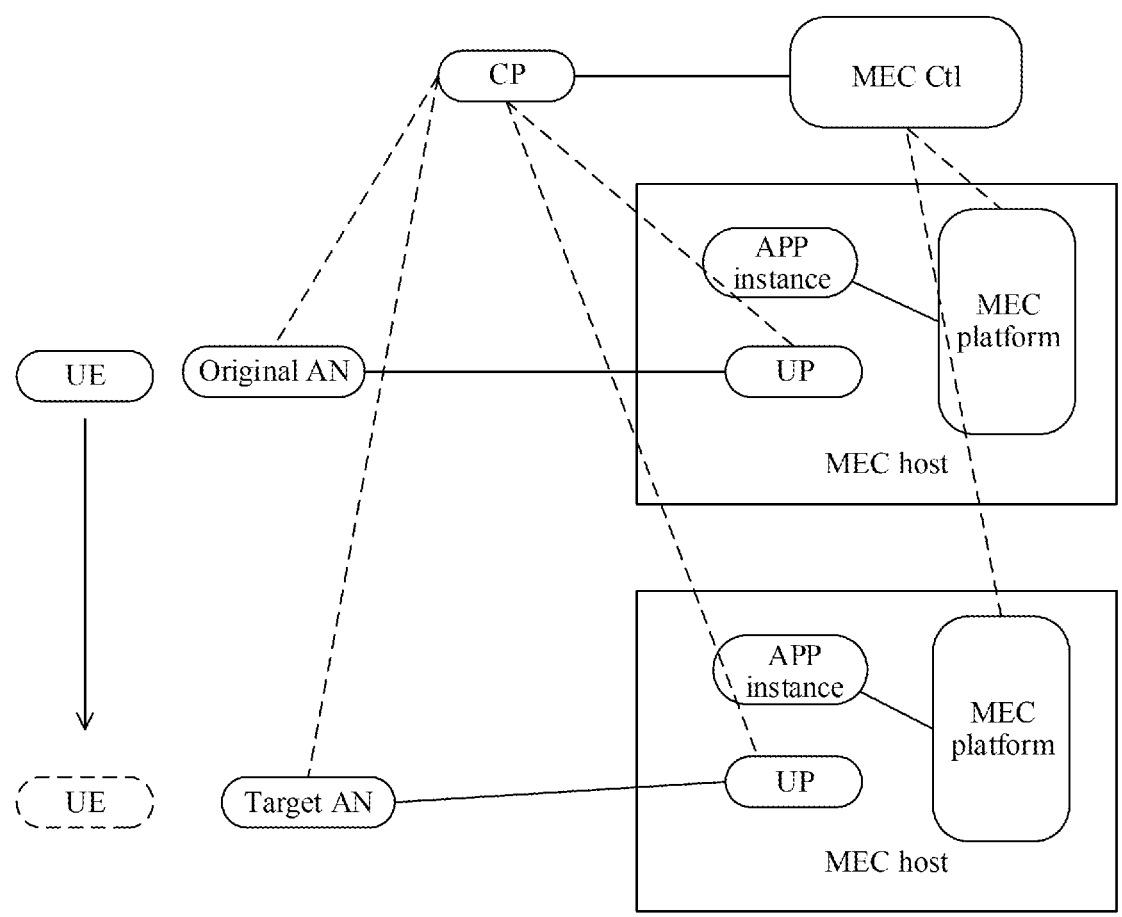
FIG. 1 is a schematic diagram of a system architecture to which an application instance address translation method is applied according to an embodiment of this application.

FIG. 1 is a schematic diagram of a system architecture to which an application instance address translation method is applied according to an embodiment of this application. The system architecture includes a terminal (UE), at least two access networks (AN), a control plane (CP) device, a MEC centralized control management (MEC Ctl) device. The system architecture further includes at least two mobile edge hosts, and the mobile edge host is also referred to as a MEC host. The MEC host is a mobile edge infrastructure. For example, the MEC host may include one or more servers and another network device. A network resource of the formed network architecture is used to provide a service platform for an application instance. Each MEC host corresponds to a user plane (UP) device. The service device described in the background may be the user plane device. A separate mobile edge platform is further set on each MEC host, and a mobile edge platform is also referred to as a MEC platform. At least one application instance is deployed on the MEC platform. In FIG. 1, an application (APP) instance is used to represent one application instance. The application instance is used to provide an application service for the UE. In this embodiment of this application, an application service is a service provided for the terminal by each application, for example, a video application service operated by a developer. The application instances are specific applications, of a same application service, deployed on different MEC platforms. Therefore, one application service may correspond to a plurality of application instances.

The AN is configured to access a network when the UE accesses a network service, and receive, in real time, a measurement report sent by the UE, to detect a signal strength between the UE and another AN point. When the AN connected by the UE detects that the signal strength between the UE and the other AN and a signal strength between the AN and the UE reach a moving threshold, the AN decides to hand over the UE to a target AN. In FIG. 1, an original AN indicates an AN used by the UE when the UE initially accesses a network, and the target AN indicates an AN newly accessed by the UE after the UE moves. In this application, one AN may be connected to one MEC host, or a plurality of ANs may be connected to one MEC host. In the example in FIG. 1, the original AN and the target AN each are connected to one MEC host. The AN in this application may be a base station, such as a LTE evolved NodeB (eNB), an enterprise LTE (eLTE) eNB, or a new radio base station (new radio gNB, NR gNB). This is not limited in this application.

A CP is a core network element configured to formulate a packet forwarding policy, and control a UP to forward a packet according to the packet forwarding policy. The CP is separately connected to the MEC Ctl, the plurality of ANs, and UPs on the plurality of MEC hosts. The CP respectively obtains request information and service information from the AN and the MEC Ctl, to formulate the forwarding policy, and sends the forwarding policy to the UP, to instruct the UP to forward a packet according to the forwarding policy. For example, the CP receives a handover request sent by the original AN to hand over a network connection of the UE to the target AN, then the CP obtains, from the MEC Ctl, an address of an original instance and an address of a target instance of an application service used by the UE, and the CP formulates the packet forwarding policy based on the address of the original instance and the address of the target instance. The CP and the MEC Ctl collaboratively determine a target UP, and then the CP sends the formulated forwarding policy to the target UP, so that the target UP forwards a packet according to the forwarding policy.

The UP is configured to receive an uplink packet sent by the UE, then forward the packet to an application instance on a corresponding MEC platform according to the forwarding policy. When a downlink packet is received, the UP is configured to forward the downlink packet to the UE according to the forwarding policy.

The MEC Ctl is connected to a MEC platform in a plurality of MEC hosts, and the MEC Ctl is configured to manage and control a plurality of MEC platforms. In a possible implementation, a service mobility control (SM) device may be set on the MEC Ctl. The MEC Ctl is connected to, by using the SM Ctl, application instances deployed on the plurality of MEC platforms, and the SM Ctl is configured to manage and control the application instances on the plurality of MEC platforms. The SM Ctl stores application instance deployment information, and the information includes information about application instances deployed on MEC platforms connected to the SM Ctl and information about mapping service relationships between different MEC platforms and different ANs. That is, the MEC Ctl may obtain, by using the SM Ctl and based on information about an AN, information about at least one MEC platform served by the determined AN. In another possible implementation, the SM Ctl may be independent of the MEC Ctl. The SM Ctl and the MEC Ctl may be connected by using an air interface or a wired connection. The SM Ctl obtains, from the MEC Ctl, the information about the application instances deployed on the plurality of MEC platforms.

An embodiment of this application is to set an address translation function on the UP based on the foregoing system architecture. For a specific system architecture, refer to FIG. 2. The UP translates a destination address of an uplink packet and translates an original address of a downlink packet according to an address translation instruction formulated by the CP. In this way, after the UE moves, the UE side does not need to sense an application instance, on a new MEC platform, to which the UE has been handed over, and may perform service access on the new application instance. This reduces a network delay. Specific descriptions are as follows.

Figure 3:
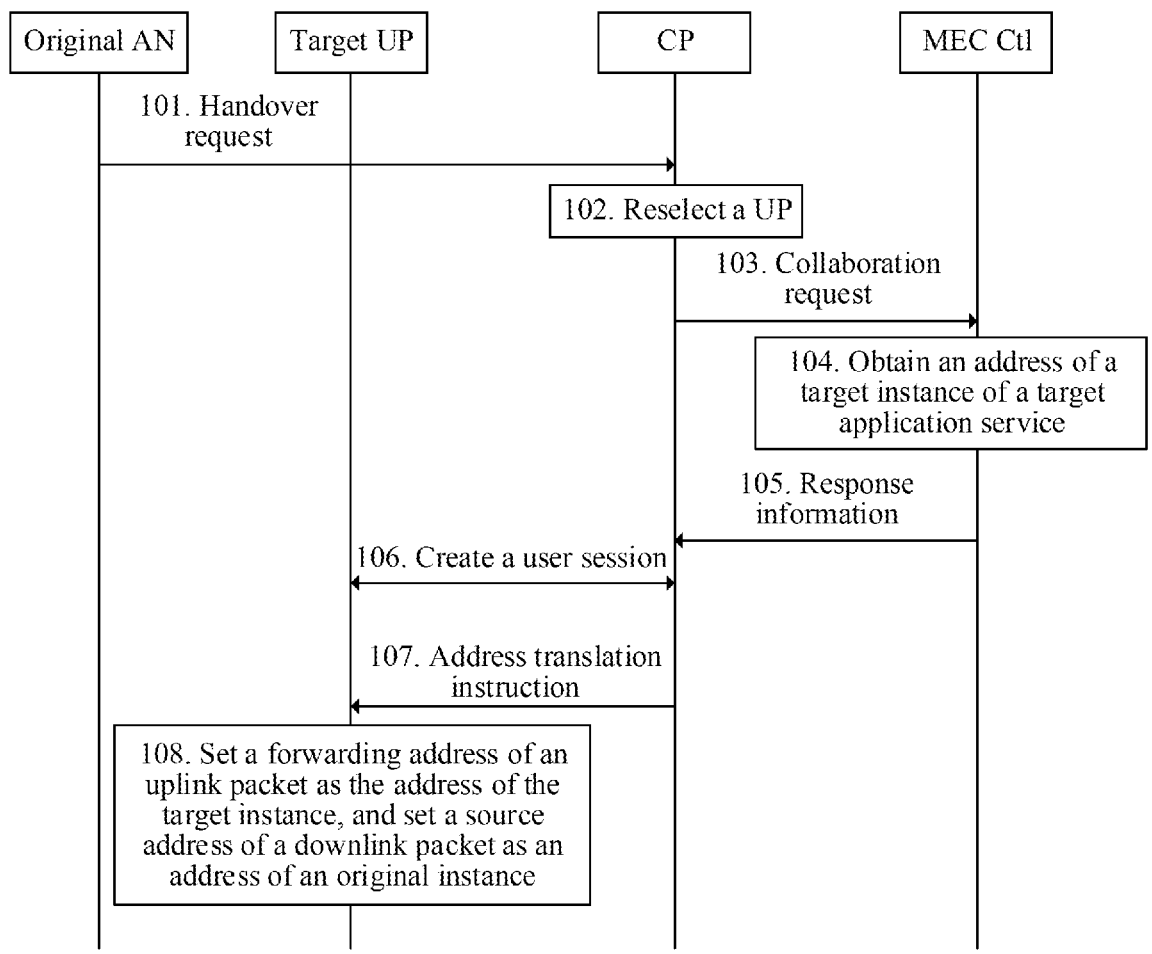
FIG. 3 is a schematic diagram of an embodiment of an application instance address translation method according to an embodiment of this application.

Referring to FIG. 3, an embodiment of an application instance address translation method according to an embodiment of this application includes the following steps.

Step 101. An original AN or a target AN sends a handover request to a CP, and the CP receives the handover request, where the handover request is used to request to hand over a network connection of UE from the original AN to the target AN.

The UE is connected to the original AN by using a network, and accesses a target application instance on a MEC platform by using the MEC platform served by the original AN, for example, accesses a video service. When the UE moves, the UE is handed over from the original AN to the target AN, and the original AN or the target AN sends the handover request to the CP. The handover request carries location information of the UE.

For example, in an air interface handover preparation phase, the original AN may send a handover requirement (handover required) to the target AN, and after the target AN feeds back acknowledgment information of the handover requirement, the target AN sends a path switch request preparation message to the CP. That is, the foregoing handover request may be the path switch request preparation message sent by the target AN. In another implementation, for S1 handover (there is no direct interface between ANs), the original AN sends a handover requirement (handover required) to the CP in a handover preparation phase, and the CP sends a handover request message to the target AN. The target AN replies to the handover request message from the CP with an acknowledgment message. In this case, the CP may confirm handover to the target AN. That is, the foregoing handover request may be the handover requirement sent by the original AN.

Step 102. The CP reselects a UP based on the location information of the UE and/or service-related attribute information.

For example, the location information of the UE is network location information of the UE, for example, information about the target AN and information about a tracking area; or the location information of the UE is geographical location information of the UE. The information about the tracking area is information about an area in which the UE is located, and is reported after a location of the UE is changed.

The service-related attribute information may be locally configured by the CP, or may be obtained by the CP from a MEC Ctl. The service-related attribute information may refer to an attribute of a service and session continuity (SSC). The CP determines, based on the SSC, whether to reselect a UP.

When the CP determines that the UE needs to be handed over to the target AN, the CP not only needs to collaborate with the MEC Ctl to perform application layer user state transition of the application service, but also needs to perform network connection (Socket) transition. For example, if the application service is a video service, the user state transition includes: transition of information such as duration of a video already played on the UE and authentication information of the UE. The network connection transition includes: a session context corresponding to the Socket is extracted from a source side device (the source side device includes the original AN and the MEC platform), transmitted to a destination service layer, and installed. In addition, because different ANs may serve different MEC platforms, after the UE accesses the target AN, the UE is handed over from an application instance currently providing an application service to an application instance on a MEC platform served by the target AN. Therefore, the CP further needs to collaborate with the MEC Ctl to perform an application service instance address translation. This is further described with reference to step 103.

Step 103. The CP sends a collaboration request to the MEC Ctl. Correspondingly, the MEC Ctl receives the collaboration request sent by the CP.

Because the MEC Ctl stores a mapping service relationship between each MEC platform and a network service range (for example, a list of ANs served by each MEC platform, or a UP corresponding to each MEC platform), the collaboration request sent by the CP to the MEC Ctl needs to carry the location information of the UE, so that the MEC Ctl decides, based on the location information of the UE, whether service transition needs to be performed. If service transition needs to be performed, the MEC Ctl further determines a corresponding MEC platform, to determine an address of the target application instance on the MEC platform.

For example, the location information of the UE included in the collaboration request may include the foregoing location information, or the location information of the UE may further be information about a target UP or information about a target MEC host/information about a target MEC platform. The information about the target UP is information about a UP reselected by the CP, for example, an ID of the target UP. The CP searches for a corresponding MEC host or a corresponding MEC platform based on the target UP, and determines that the MEC host or the MEC platform is the target MEC host or the target MEC platform.

In a possible implementation, the CP may directly select and determine the target UP, for example, when one AN serves one UP.

In another possible implementation, one AN may serve a plurality of UPs. When the CP determines to reselect a UP, if the target AN serves a plurality of UPs, the CP selects a plurality of UPs. In this case, the CP may request the MEC Ctl to collaboratively determine a unique target UP. Optionally, the collaboration request sent by the CP to the MEC Ctl may further include information about the plurality of UPs selected by the CP.

Step 104. The MEC Ctl determines information about a target instance of a target application service based on the location information of the UE, and obtains an address of the target instance.

In the example in FIG. 1, the MEC Ctl may be connected, by using the SM Ctl, to the application instance deployed on each MEC platform. The SM Ctl stores information about the application instance deployed on the connected MEC platform (application instance deployment information), and the SM Ctl further stores information about mapping service relationships between different MEC platforms and different ANs. Therefore, the MEC Ctl may query, based on the location information of the UE (the location information of the UE may be any one or more types of the network location information of the UE described in step 102), the MEC platform served by the target AN from the application instance deployment information.

For example, if the location information of the UE includes the information about the target AN, the MEC Ctl directly determines the target MEC platform based on the information about the target AN. If the location information of the UE includes the information about the tracking area, the MEC Ctl may first determine an AN whose service area includes the tracking area, then determine the target AN, and further determine the target MEC platform. After determining the target MEC platform, the MEC Ctl may determine, based on information about the target application service (for example, an identifier of the target application service), the target application instance deployed on the target MEC platform, to obtain the address of the target application instance.

Step 105. The MEC Ctl sends response information to the CP, and the CP receives the response information sent by the MEC Ctl. The response information includes an address of an original instance and the address of the target instance of the target application service, so that the CP sends, to the target UP based on the response message, a request/an instruction for performing address translation.

The MEC Ctl needs to send the address of the original instance and the address of the target instance to the CP, so that the CP formulates the address translation policy based on the address of the original instance and the address of the target instance, to instruct the target UP to perform address translation. When the UE accesses the application instance of the target application service on the MEC platform corresponding to the original AN, the CP needs to request the MEC Ctl to coordinately obtain the address of the application instance on the MEC platform corresponding to the original AN. The address of the original instance of the application service may be retained on the MEC Ctl. After obtaining the address of the target instance of the target application service, the MEC Ctl sends both the address of the target instance and the address of the original instance to the CP. In another possible implementation, the MEC Ctl may alternatively send only the address of the target instance of the target service, and does not need to send the address of the original instance. When the UE accesses an original application instance of the target service, the CP has obtained the address of the original instance of the target service. Therefore, if the CP stores the address of the original instance, the MEC Ctl may not send the address of the original instance to the CP.

Optionally, if the target AN serves a plurality of UPs, the CP may select at least one UP based on the UPs corresponding to the target AN in a resource pool, and send information about the at least one selected UP to the MEC Ctl by using the foregoing collaboration request. The MEC Ctl determines information about the target UP from the information about the at least one determined UP. For example, the resource pool includes a service mapping relationship between each AN and each UP. It should be noted that because a plurality of ANs may simultaneously serve one UP, if a UP served by the original AN and a UP served by the target AN are the same UP, the CP does not need to reselect a new UP.

The MEC Ctl determines the target UP in two manners.

A first manner is as follows: the MEC Ctl determines the target MEC platform based on the location information of the UE, and then determines a UP corresponding to the target MEC platform. Because UPs are in a one-to-one correspondence with MEC platforms, the UP corresponding to the target MEC platform may be determined as the target UP.

A second manner is as follows: the MEC Ctl determines, based on the plurality of UPs sent by the CP, MEC platforms corresponding to the plurality of UPs respectively, and then determines, from the MEC platforms based on the identifier of the target service, a MEC platform on which the application instance of the target application service is deployed. The MEC platform on which the application instance of the target application service is deployed is determined as the target MEC platform, and further, a UP corresponding to the target MEC platform is determined as the target UP.

After selecting the target UP, the MEC Ctl sends the information about the target UP to the CP by using the response message. That is, the response message sent by the MEC Ctl to the CP may further include the information about the target UP determined by the MEC Ctl.

Step 106. The CP creates a user session with the target UP.

The CP does not forward a packet, but the UP is configured to forward a packet. After the UE moves and is connected to the target AN, the target UP needs to be configured to send a packet. Therefore, the CP needs to create the user session with the determined target UP, so that information such as the packet forwarding policy and address translation instruction is sent to the target UP.

Step 107. The CP sends the address translation instruction to the target UP, and the target UP receives the address translation instruction sent by the CP. The address translation instruction includes the address of the original instance and the address of the target instance of the target application service.

Step 108. The target UP sets, according to the address translation instruction, a forwarding address of an uplink packet between the target application service and the UE as the address of the target instance, and sets a source address of a downlink packet between the target application service and the UE as the address of the original instance.

Figure 2:
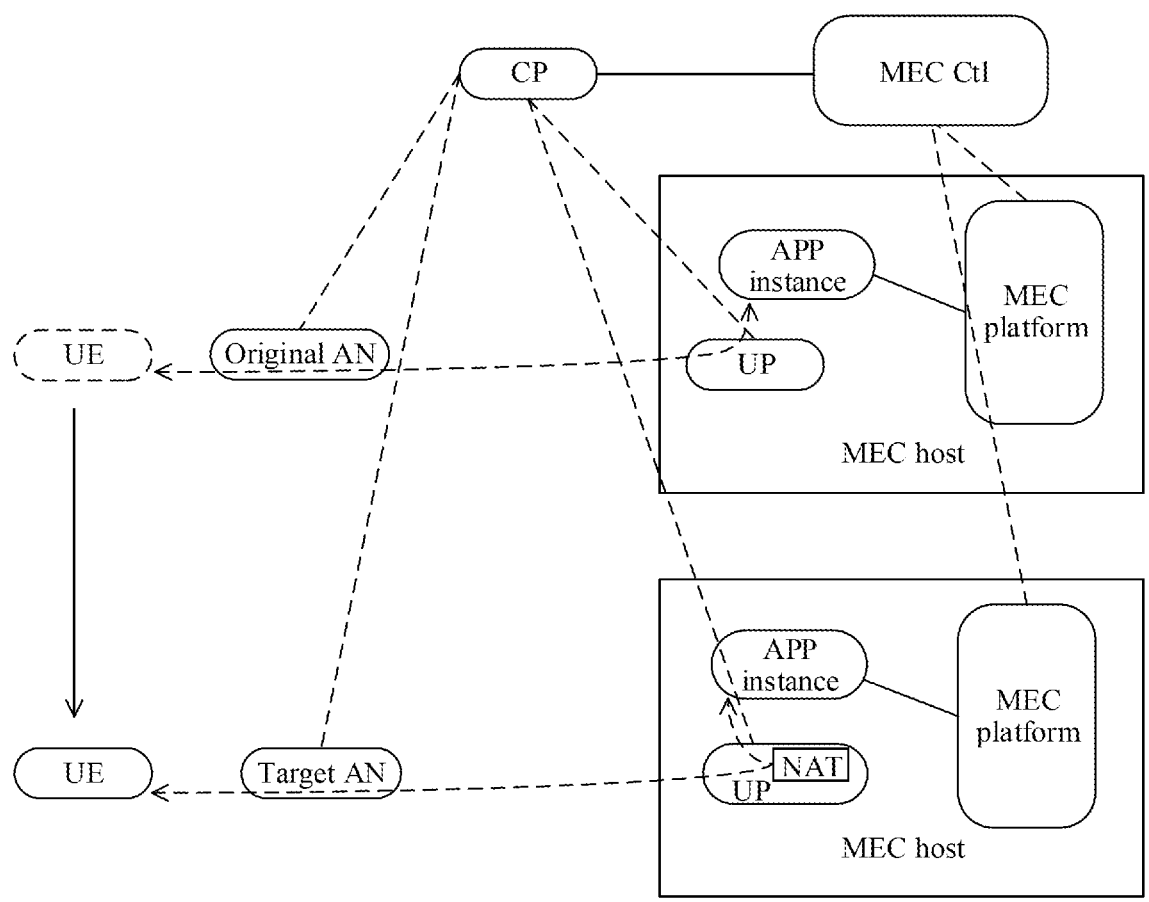
FIG. 2 is a schematic diagram of another system architecture to which an application instance address translation method is applied according to an embodiment of this application.

After obtaining the address of the original instance and the address of the target instance of the target application service, the CP formulates the address translation policy. The address translation policy is as follows: the forwarding address of the uplink packet between the target application service and the UE is set as the address of the target instance, and the source address of the downlink packet between the target application service and the UE is set as the address of the original instance. As shown in FIG. 2, a network address translation (NAT) function is provided on the target UP. After receiving the network address translation instruction, the target UP performs address translation according to the address translation policy. In this way, the UE side does not sense that an application instance of a connected target application service is changed, and when sending the uplink packet, the UE side needs to send the uplink packet only based on the address of the original instance. When the uplink packet arrives at the target UP, the target UP forwards the uplink packet to the target instance of the target application service. When the target application instance of the target application service sends the downlink packet, the target UP translates the source address of the downlink packet into the address of the original instance. In this way, the UE side does not sense that the packet is sent by the new instance of the target application service, and therefore can identify the downlink packet. In the foregoing address translation manner of the application instance, after the UE moves, the UE can directly perform packet exchange without recreating a service connection to the new instance of the target application service. This reduces a network delay.

In a possible implementation, the UE has performed at least one time of area movement before moving to a service range of the target AN. Consequently, before the UE is handed over to the target instance of the target application service, an application instance currently used in communication is not an initial application instance. Consequently, an address of an original instance obtained by the CP from the MEC Ctl is not an initial instance address. For example, the UE initially accesses a video service by using a first AN, and an instance address of the service connected by the UE is a first instance address of a first MEC platform corresponding to the first AN. After one movement, the UE accesses a second AN. After address translation, the UE actually communicates with an application instance on a second MEC platform corresponding to the second AN. An address corresponding to the application instance is an address of a second instance on the second MEC platform. After the UE moves again, the UE accesses a third AN. In this case, before the CP determines a third MEC platform, an obtained address is not the original first instance address, but is the current second instance address obtained after the first movement of the UE.

In this case, the address of the original instance of the target application service obtained by the CP is an address of a current instance used for service access between the target application service and the UE, but is not an initial instance address used for service access between the target application service and the UE, that is, the instance address of the target application service initially accessed by the UE. To implement that the UE cannot sense that the connected application instance of the target application service changes regardless of how many times a service area of the AN is changed, a network side needs to always set a forwarding address of a downlink packet as the initial instance address used by the UE to access the target application service. Therefore, after obtaining the address of the original instance, the CP may further query whether the address of the original instance is the same as the initial instance address used for service access between the target application service and the UE. Because an address translation instruction after each change is formulated by the CP, the CP needs to perform comparison and query only based on a previously stored mapping status, to determine the initial instance address used for the access connection between the target application service and the terminal.

Based on the described possible cases, when the address of the original instance is the current instance address rather than the initial instance address, this embodiment of this application may further include the following steps.

The CP obtains, based on the current instance address, the initial instance address used when the UE accesses the target application service.

The CP formulates the address translation policy based on the initial instance address and the address of the target instance. The policy may be used to instruct the target UP to set the forwarding address of the uplink packet between the target application service and the UE as the address of the target instance, and set the source address of the downlink packet between the target application service and the UE as the initial instance address.

In the embodiments described above, an NAT function is provided on the UP, the CP formulates the address translation policy of the application instance, and the UP performs the application instance address translation. In another implementation, the NAT function may alternatively be set on the MEC platform, the MEC platform formulates the address translation policy of the application instance, and the MEC platform performs the application instance address translation. For a specific system framework, refer to FIG. 4.

Figure 4:
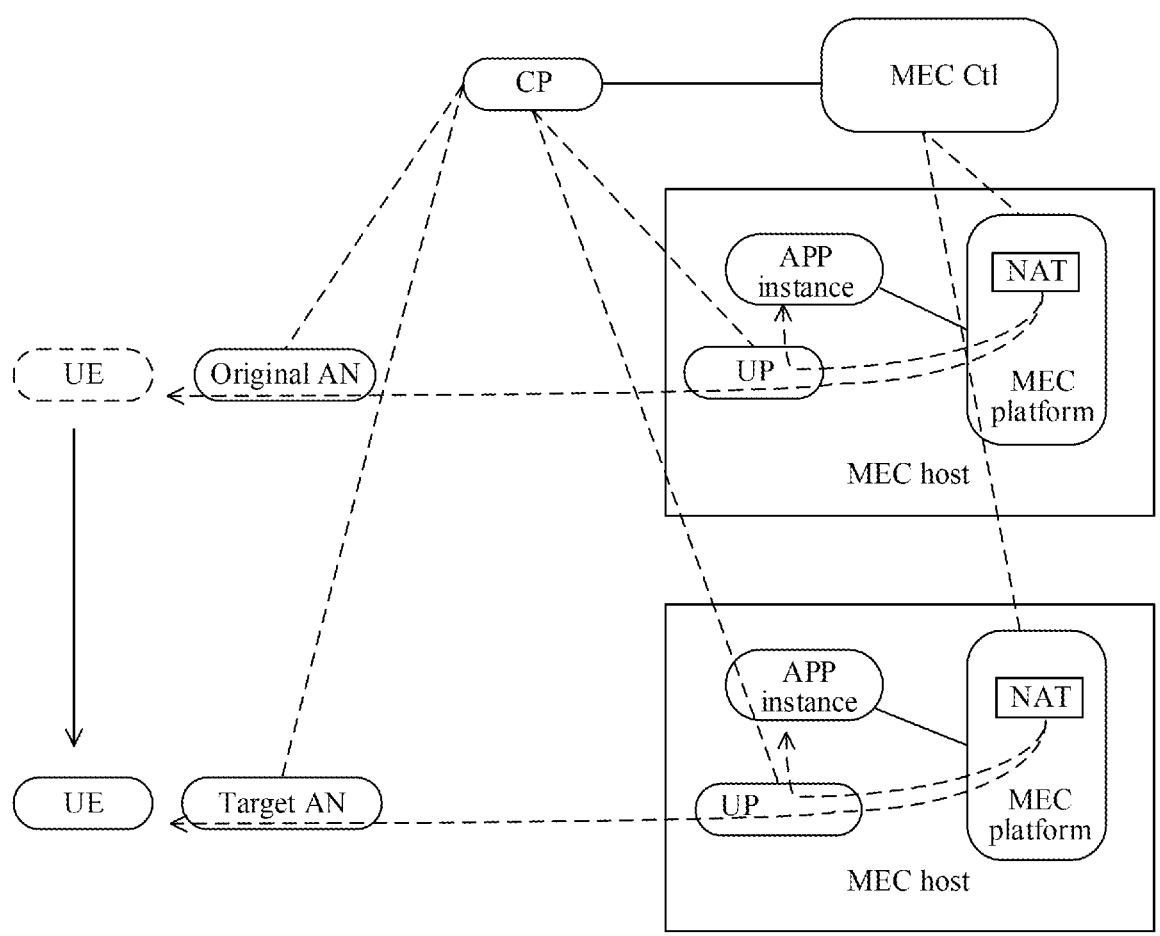
FIG. 4 is a schematic diagram of another system architecture to which an application instance address translation method is applied according to an embodiment of this application.

In the architecture in FIG. 4, when an application service is to be deployed on the MEC platform, an application for registration needs to be sent to the MEC platform. Correspondingly, the MEC platform receives the application for registration sent by the target application service, and the application for registration includes a service address of the application service and a network address translation NAT service request identifier. The NAT service request identifier is used to request to perform address translation of a service data flow of the UE and the target application service on the MEC platform. It should be noted that the service address of the application service is used to mark the application service in a form of an IP address. Service addresses used by a same application service on all MEC platforms are the same. In this embodiment of this application, regardless of which application instance is accessed by the UE, the UE obtains a service address of an application service corresponding to the application instance, but not an instance address of the application instance.

In this embodiment of this application, the NAT function is provided on the MEC platform. After obtaining the service address of the target application service and the NAT service request identifier, the MEC platform may formulate the address translation policy for the target application service. The policy may be as follows: the forwarding address of the uplink packet between the UE and the target application service is set as an address of a local application instance, and the source address of the downlink packet delivered by the target application service to the UE is set as the service address of the target application service.

Figure 5:
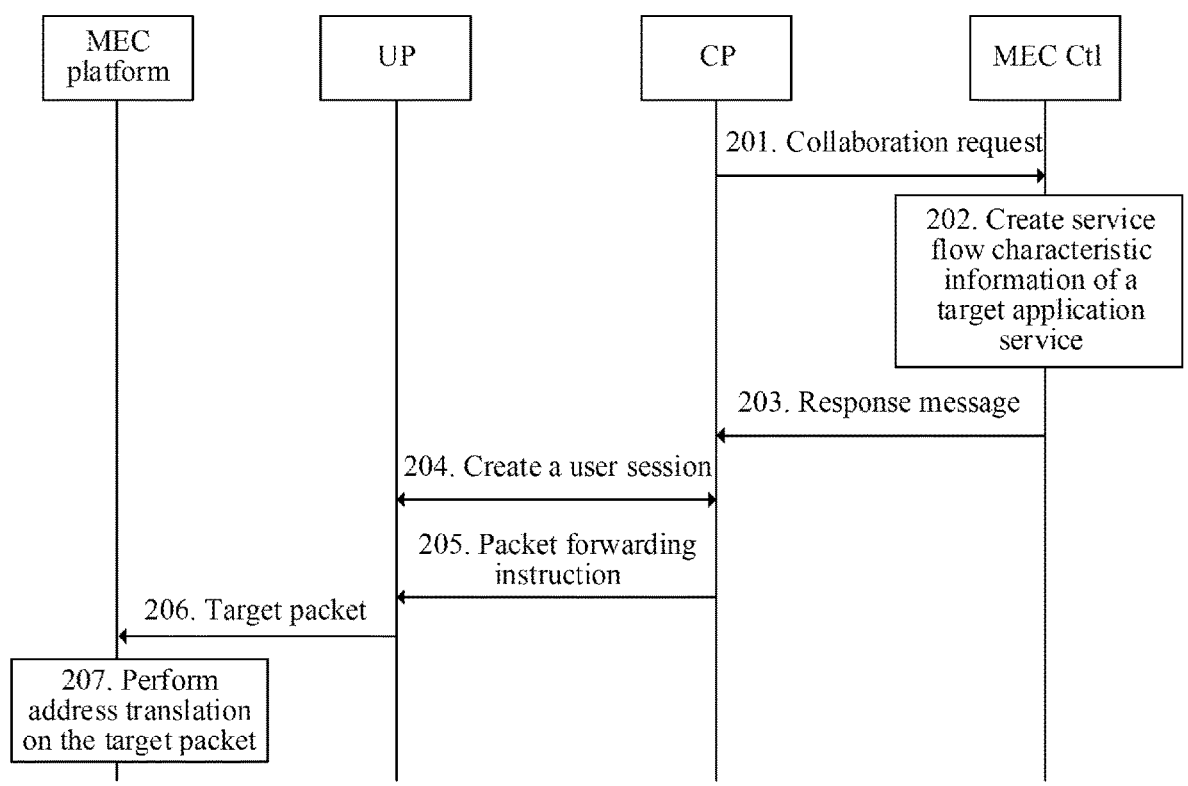
FIG. 5 is a schematic diagram of another embodiment of an application instance address translation method according to an embodiment of this application.

Referring to FIG. 5, an embodiment of FIG. 5 describes a procedure in which UE sets up a new service by using the system architecture shown in FIG. 4. Another embodiment of an application instance address translation method in the embodiments of this application includes the following steps.

Step 201. When the UE initiates a service request of a target application service, a CP sends a collaboration request to a MEC Ctl, and the MEC Ctl receives a collaboration request sent by the CP. The collaboration request includes location information of the UE and an identifier of the target application service.

When the UE needs to access a service of the target application service, the UE needs to initiate the service request. After receiving the service request, the CP sends the collaboration request to the MEC Ctl, so that the UE can establish a session connection to the destination application. For example, the UE sends a service flow packet to the target application service by using the UP, and if the UP detects that the packet is a new service flow packet, the UP reports the service request to the CP. The CP initiates the collaboration request to the MEC Ctl, and the collaboration request carries the location information of the UE and the identifier of the target application service, so that the MEC Ctl determines, based on the location information of the UE and the identifier of the target application service, an application instance of a MEC platform that the UE needs to access.

Step 202. The MEC Ctl creates, based on the location information of the UE and the identifier of the target application service, service flow characteristic information of the target application service.

The MEC Ctl needs to first determine a MEC platform on which the UE establishes a connection to an application instance. Therefore, the MEC Ctl may determine the MEC platform based on the location information of the UE, for example, the location information of the UE is information about an AN connected to the UE, and determine that a MEC platform served by the AN is the MEC platform that the UE needs to access. Then, the MEC Ctl searches the MEC platform for a service address and an instance address of the target application service based on the identifier of the target application service, and further creates the service flow characteristic information of the target application service. The service flow characteristic information may be 5-tuple information, and includes a source IP, a source port number, a network communications protocol in use (transmission control protocol/user datagram protocol, TCP/UDP), a destination IP, and a destination port number. The service flow characteristic information includes uplink service flow characteristic information and downlink service flow characteristic information. A destination IP of the uplink service flow characteristic information is the service address of the target application service, and a source IP of the downlink service flow characteristic information is the instance address of the target application service.

Step 203. The MEC Ctl sends a response message to the CP, and the CP receives the response message sent by the MEC Ctl. The response message includes the service flow characteristic information of the target application service.

In this embodiment of this application, formulation of the address translation policy of the application instance and a specific translation operation are both performed on the MEC platform. Therefore, the MEC Ctl may further add instruction information in the response message. The instruction information is used to instruct the CP to control the UP to forward a packet exchanged between the UE and the target application service to the MEC platform for address translation.

It should be noted that steps 202 and 203 are optional steps. In another implementation, the service flow characteristic information may be created by the CP. After the CP sends the collaboration request to the MEC Ctl, the MEC Ctl needs to return to the CP, only necessary factors for creating the service flow characteristic information: the service address of the target application service and the instance address on the determined MEC platform. Therefore, the step 202 may be replaced by: the MEC Ctl determines, based on the location information of the UE and the identifier of the target application service, the service address of the target application service and the instance address on the corresponding MEC platform. Step 203 may be replaced by: the MEC Ctl sends a response message, and the response message includes the service address and the instance address. The CP creates the service flow characteristic information based on the service address and the instance address.

Step 204. The CP creates a user session with the UP.

The UP is a UP corresponding to the MEC platform determined by the MEC Ctl.

Step 205. The CP sends a packet forwarding instruction to the UP. The UP receives the packet forwarding instruction sent by the CP. The packet forwarding instruction includes the service flow characteristic information of the target application service, and the packet forwarding instruction is used to instruct the UP to send, based on the service flow characteristic information of the target application service, the packet exchanged between the UE and the target application service to the MEC platform for address translation.

In this embodiment of this application, the CP does not formulate the address translation policy. After receiving the response message sent by the MEC Ctl, the CP controls, based on the instruction in the response message, the UP to forward a packet exchanged between the UE and the target application service to the MEC platform for address translation. For example, the CP generates a corresponding packet forwarding instruction, and sends the packet forwarding instruction to the UP.

After receiving an uplink packet sent by the UE, the UP determines, by using the service flow characteristic information, that the uplink packet is a packet exchanged between the UE and the target application service. The UP sends the uplink packet to the corresponding MEC platform for address translation. When receiving a downlink packet sent by the application instance, the UP also needs to send the downlink packet to the MEC platform for address translation.

Step 206. The UP sends a target packet to the MEC platform. Correspondingly, the MEC platform receives the target packet sent by the UP.

The target packet is a packet exchanged between the UE and the target application service, and includes an uplink packet and a downlink packet. After receiving the uplink packet or the downlink packet, the UP first determines, based on the service flow characteristic information, that the uplink packet or the downlink packet is the target packet. Then, the UP sends the target packet to the MEC platform according to the packet forwarding instruction.

Step 207. The MEC platform performs address translation on the target packet according to the address translation policy.

After receiving the target packet, the MEC platform modifies a forwarding address or a source address of the target packet according to the pre-formulated address translation policy. For example, if the target packet is an uplink packet, the MEC platform sets a forwarding address of the uplink packet as an address of an application instance, of the target application service, deployed on the MEC platform, that is, a local instance address on the MEC platform. If the target packet is a downlink packet, the MEC platform sets a source address of the downlink packet as a service address of the target application service.

In this embodiment of this application, the CP does not formulate the address translation policy, and the UP does not perform address translation. The CP only needs to deliver the packet forwarding instruction to the UP based on a packet forwarding requirement of the MEC platform. After receiving the uplink packet sent by the UE, the UP only needs to send the uplink data to the MEC platform for address translation, then the MEC platform performs address translation on the uplink packet and sends an uplink packet obtained by the address translation to the UP, and the UP forwards the uplink packet to a target application instance. After receiving a downlink packet sent by the target application instance, the UP also needs to send the downlink packet to the MEC platform for address translation. The MEC platform sends a downlink packet obtained by the address translation to the UP, and then the UP forwards the downlink data to the UE.

In this embodiment of this application, a target application service deployed on each MEC platform uses a same service address. When the UE exchanges a packet with an application instance on any MEC platform, a UE side needs to use only the service address. Each MEC platform formulates an address translation policy, that is, a forwarding address of an uplink packet of the UE is set as a local application instance address, and a source address of a downlink packet of an application instance is set as a service address. In this way, a MEC platform that needs to perform address translation does not need to dynamically obtain an address of an application instance on another MEC platform (for example, an initial instance address used by the UE to access the target application service), so that signaling interworking is reduced, and a network delay is reduced.

The embodiment in FIG. 5 describes a process in which the UE establishes a new service. The solution described in the embodiment in FIG. 5 is also applicable to a scenario in which a network side specifically performs address translation on a packet used by the terminal to access a target application service after the UE moves to a service area of another AN. When this solution is applicable to a scenario in which a network side performs address translation on a packet after the UE moves, the MEC platform is a new MEC platform that is determined by the MEC Ctl and that is corresponding to the target AN accessed by the UE. The new MEC platform also has an address translation function. The UP is a target UP that is coordinately determined by the CP and the MEC Ctl and that is corresponding to the new MEC platform. The target UP forwards the target packet to the new MEC platform according to the packet forwarding instruction delivered by the CP. For details, refer to description content of the embodiment in FIG. 5. Details are not described herein again.

Figure 6:
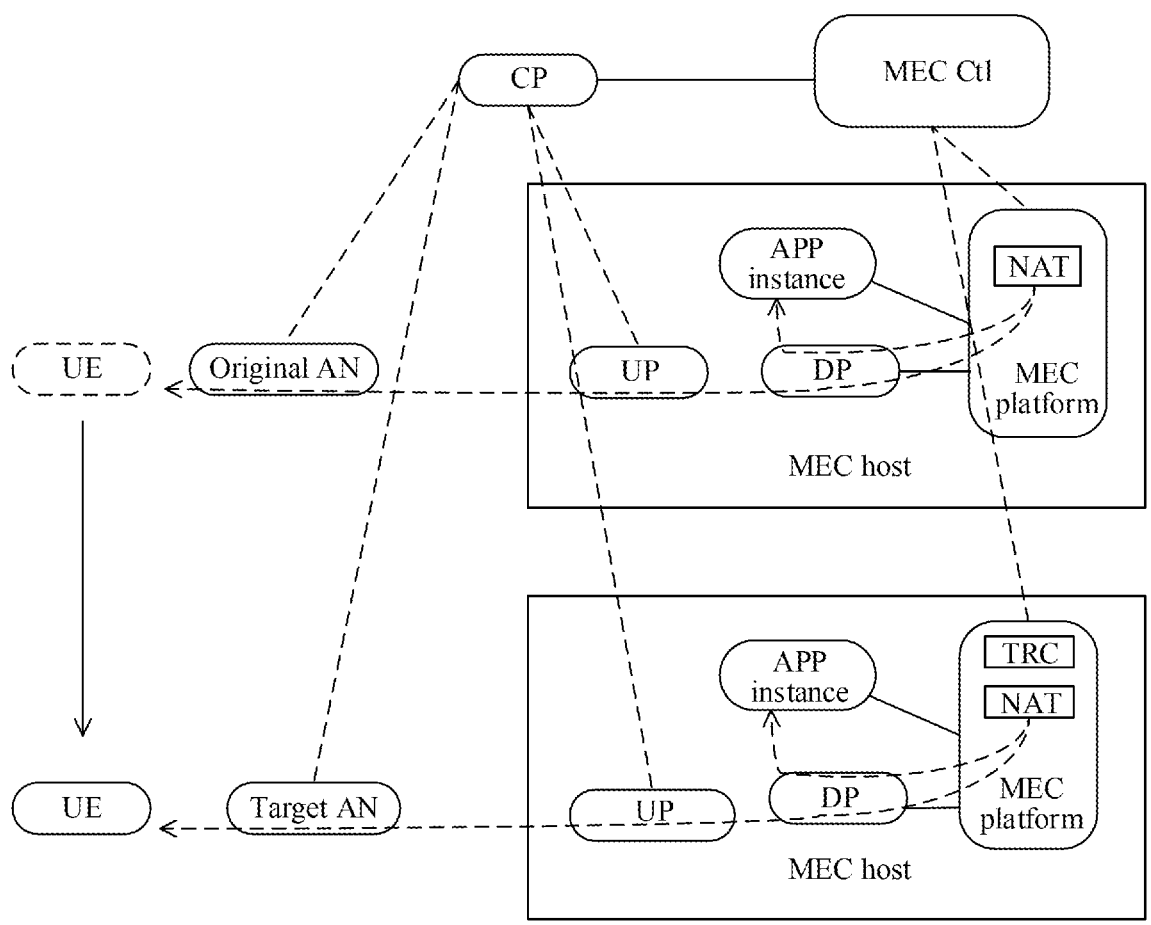
FIG. 6 is a schematic diagram of another system architecture to which an application instance address translation method is applied according to an embodiment of this application.

In the foregoing embodiment, the MEC platform formulates the address translation policy and performs the address translation operation. However, in another system architecture in an embodiment of this application shown in FIG. 6, an address translation policy of an application instance is still formulated by the MEC platform, but a packet may be forwarded by using a data plane (DP) device, instead of the UP, to the MEC platform for address translation according to an instruction. In the system architecture in FIG. 6, a DP is further set on the MEC host. The DP is separately connected to the UP and the MEC platform, and the DP is further connected to an application instance on the MEC platform. The DP is configured to perform operations such as forwarding and control on a packet. In this architecture, packets need to be forwarded by using the DP to implement packet exchange between the UP and the MEC platform. Therefore, after formulating the address translation policy, the MEC platform may send a corresponding routing rule to the DP, and the DP sends a target packet to the MEC platform for address translation according to the routing rule. A specific implementation is similar to the manner described in the embodiment in FIG. 5, and a different step is as follows.

With reference to the embodiment in FIG. 5, before the MEC platform receives the target packet sent by the UP, the translation method further includes the following steps.

The MEC platform generates the routing rule based on a configured address network segment of the UE, the service address of the target application service, and the local instance address, and the MEC platform sends the routing rule to the DP. After receiving the target packet sent by the UP, the DP sends the target packet to the MEC platform for address translation according to the routing rule.

In addition, both a packet sent by the UP to the MEC platform and a packet received from the MEC platform need to be forwarded by using the DP.

The MEC platform does not need to perform address translation on packet data exchanged between application instances, but the MEC platform needs to perform address translation on packet data between the UE after a service migration and an application service. To distinguish types of the two types of packet data, the types may be distinguished based on a network segment of the UE. For example, a network system sets an address pool (network segment) of the UE as 10.141.0.0/16. After receiving a packet by using the target UP, the DP parses a source address of the packet. If the source address belongs to the network segment of the UE, it is determined that the packet is a packet sent by the UE, and therefore, the packet needs to be sent to the MEC platform for address translation.

The routing rule formulated by the MEC platform is not only used by the DP to determine whether the target packet is a packet sent by the UE or a packet sent to the UE, but also used to determine whether the target packet needs to be sent to the MEC platform for address translation. The routing rule includes an uplink routing rule and a downlink routing rule. The uplink routing rule includes a mapping between the network segment address of the UE and the service address of the target application service. The downlink routing rule includes a mapping between the network segment address of the UE and the local instance address of the target application service. For an uplink packet, the DP determines, according to the uplink routing rule, whether a source address of the uplink packet is an address in the network segment of the UE, and determines whether a destination forwarding address of the uplink packet is the same as the service address of the target application service. When two determining results are yes, the DP sends the uplink packet to the MEC platform for address translation. For a downlink packet, the DP determines, according to the downlink routing rule, whether a source address of the downlink packet is an address in the network segment of the UE, and determines whether a destination forwarding address of the uplink packet is the same as the service address of the target application service. When two determining results are yes, the DP sends the downlink packet to the target UP for packet forwarding.

In this embodiment of this application, the MEC platform formulates the address translation policy. For example, the address translation policy may be formulated by a traffic rule control unit (TRC) on the MEC platform. The MEC platform further configures the routing rule, and sends the routing rule to the DP, and the DP performs a specific packet forwarding operation.

Figure 7:
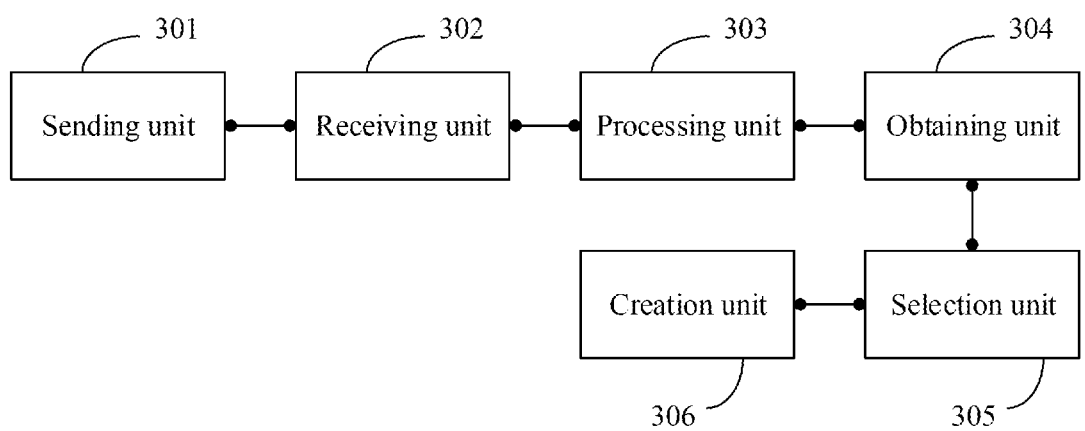
FIG. 7 is a schematic diagram of an embodiment of an application instance address translation apparatus according to an embodiment of this application.

Referring to FIG. 7, an embodiment of an application instance address translation apparatus according to this embodiment of this application includes: a sending unit 301, configured to send a collaboration request to a mobile edge cloud MEC control device, where the collaboration request includes location information of a terminal and information about an application service, and the application service is an application service accessed by the terminal; a receiving unit 302, configured to receive response information from the MEC control device, where the response information includes an address of a target instance, and the address of the target instance is associated with the location information of the terminal and the information about the application service, where the sending unit 301 is further configured to send, based on the address of the target instance, the address of the target instance to a first user plane device corresponding to the target instance; and a processing unit 303, configured to instruct the first user plane device to set, as the address of the target instance, a forwarding address of an uplink packet sent by the terminal to obtain the application service.

Optionally, the apparatus further includes: an obtaining unit 304, configured to obtain, based on an address of an application instance currently communicating with the terminal, an initial instance address used when the terminal accesses the application service, where the processing unit 303 is further configured to instruct the first user plane device to set, as the initial instance address, a source address of a downlink packet sent by the target instance to the terminal.

Optionally, the receiving unit 302 is further configured to: receive a handover request, where the handover request is used to request to hand over the terminal from an original access network AN to a target AN; and the apparatus further includes: a selection unit 305, configured to select, based on the target AN, at least one user plane device corresponding to the target AN, where the collaboration request includes information about the at least one user plane device, and the response message includes information about the first user plane device; and a creation unit 306, configured to create a session between the terminal and the first user plane device.

When the units described in the embodiment in FIG. 7 run, the units may further perform the steps performed by the CP in the embodiment in FIG. 3. For detailed content, refer to the embodiment in FIG. 3. Details are not described herein again.

Figure 8:
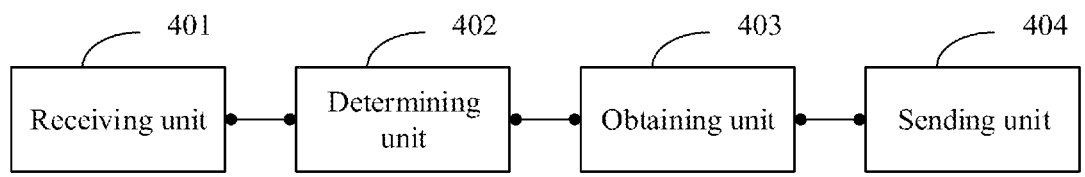
FIG. 8 is a schematic diagram of another embodiment of an application instance address translation apparatus according to an embodiment of this application.

Referring to FIG. 8, another embodiment of an application instance address translation apparatus according to this embodiment of this application includes: a receiving unit 401, configured to receive a collaboration request from a control plane device, where the collaboration request includes location information of a terminal and information about an application service, and the application service is an application service accessed by the terminal; a determining unit 402, configured to determine a target instance of the application service based on the collaboration request; an obtaining unit 403, configured to obtain an address of the target instance, where the target instance is an application instance that provides the application service and whose service location range includes a location of the terminal; and a sending unit 404, configured to send response information to the control plane device, where the response information includes the address of the target instance, and the address of the target instance is used for packet address translation.

Optionally, the location information of the terminal includes information about a target access network AN accessed by the terminal.

The receiving unit 401 is specifically configured to: determine, based on the information about the target AN, at least one mobile edge cloud MEC platform corresponding to the target AN; and determine, based on the information about the application service, a first MEC platform from the at least one MEC platform, and determine an application instance of the application service deployed on the first MEC platform, where the first MEC platform is a MEC platform that provides the application service.

When the units described in the embodiment in FIG. 8 run, the units may further perform the steps performed by the MEC Ctl in the embodiment in FIG. 3. For detailed content, refer to the embodiment in FIG. 3. Details are not described herein again.

Figure 9:
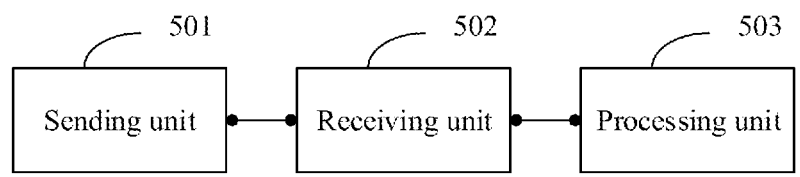
FIG. 9 is a schematic diagram of another embodiment of an application instance address translation apparatus according to an embodiment of this application.

Referring to FIG. 9, another embodiment of an application instance address translation apparatus according to this embodiment of this application includes: a sending unit 501, configured to send a collaboration request to a mobile edge cloud MEC control device, where the collaboration request includes location information of a terminal and information about an application service, and the application service is an application service accessed by the terminal; a receiving unit 502, configured to receive response information from the MEC control device, where the response information includes an identifier of a first mobile edge cloud MEC platform, the first MEC platform is a MEC platform that provides the application service, and the identifier of the first MEC platform is associated with the location information of the terminal and the information about the application service, where the sending unit 501 is further configured to send the identifier of the first MEC platform to a first user plane device, and instruct the first user plane device to send a target packet to the first MEC platform, where the target packet is a packet used by the terminal to access the application service; and a processing unit 503, configured to control the sending unit 501 to perform a sending step, and control the receiving unit 502 to perform a receiving step.

Optionally, the response message further includes service flow characteristic information, and the service flow characteristic information is associated with the terminal and the information about the application service.

The processing unit 503 is further configured to: instruct the first user plane device to determine a target packet based on the service flow characteristic information.

When the units described in the embodiment in FIG. 9 run, the units may further perform the steps performed by the CP in the embodiment in FIG. 5. For detailed content, refer to the embodiment in FIG. 5. Details are not described herein again.

Figure 10:
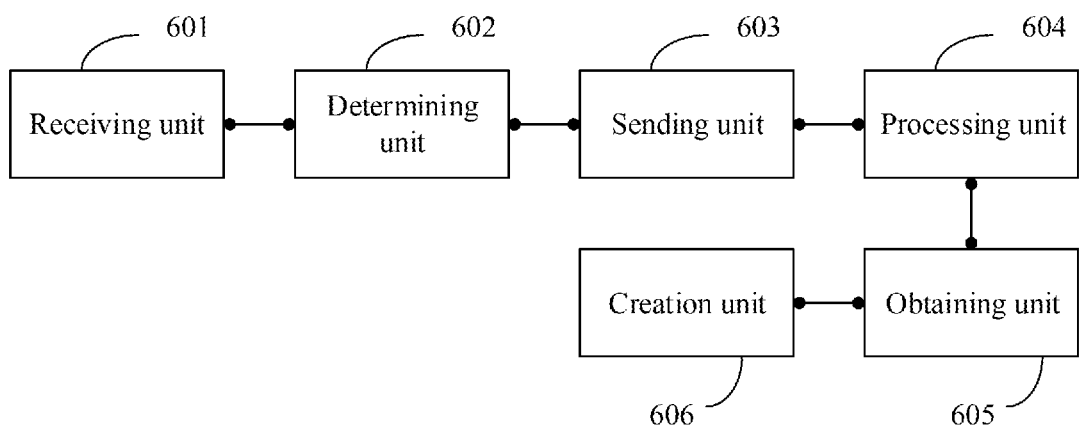
FIG. 10 is a schematic diagram of another embodiment of an application instance address translation apparatus according to an embodiment of this application.

Referring to FIG. 10, another embodiment of an application instance address translation apparatus according to this embodiment of this application includes: a receiving unit 601, configured to receive a collaboration request from a control plane device, where the collaboration request includes location information of a terminal and information about an application service, and the application service is an application service accessed by the terminal; a determining unit 602, configured to determine an identifier of a first mobile edge cloud MEC platform based on the collaboration request, where the first MEC platform is a MEC platform that provides the application service; a sending unit 603, configured to send the identifier of the first MEC platform to the control plane device; and a processing unit 604, configured to instruct the control plane device to control a first user plane device to send a target packet to the first MEC platform, where the target packet is a packet used by the terminal to access the application service.

Optionally, the apparatus further includes: an obtaining unit 605, configured to obtain a service address of the application service and an address of a target instance, and the target instance is an application instance, of the application service, deployed on the first MEC platform; and a creation unit 606, configured to create service flow characteristic information based on the service address and the address of the target instance, where the sending unit 603 is further configured to send the service flow characteristic information to the control plane device; and the processing unit 604 is further configured to instruct the control plane device to control the first user plane device to determine the target packet based on the service flow characteristic information.

When the units described in the embodiment in FIG. 10 run, the units may further perform the steps performed by the MEC Ctl in the embodiment in FIG. 5. For detailed content, refer to the embodiment in FIG. 5. Details are not described herein again.

Figure 11:
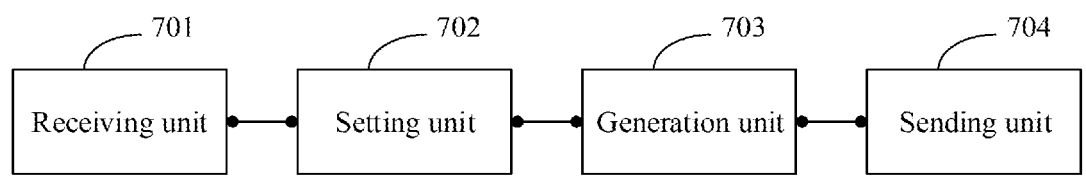
FIG. 11 is a schematic diagram of another embodiment of an application instance address translation apparatus according to an embodiment of this application.

Referring to FIG. 11, another embodiment of an application instance address translation apparatus according to this embodiment of this application includes: a receiving unit 701, configured to receive a target packet from a first user plane device, where the target packet is a packet used by a terminal to access an application service, and the application service is an application service accessed by the terminal; a setting unit 702, configured to: if the target packet is an uplink packet, set a forwarding address of the target packet as an address of a target instance, where the address of the target instance is an address of an application instance, of the application service, deployed on the MEC platform, where the setting unit 702 is further configured to: if the target packet is a downlink packet, set a source address of the target packet as a service address of the target application service.

Optionally, the receiving unit 701 is specifically configured to: receive the target packet from the first user plane device by using a data plane device; and the apparatus further includes: a generation unit 703, configured to: before the receiving unit 701 receives the target packet from the first user plane device by using the data plane device, generate a routing rule based on a configured address network segment of the terminal, a service address of the application service, and the address of the target instance; and a sending unit 704, configured to send the routing rule to the data plane device, and instruct the data plane device to send the target packet to the MEC platform according to the routing rule.

When the units described in the embodiment in FIG. 11 run, the units may further perform the steps performed by the MEC platform in the embodiment in FIG. 5. For detailed content, refer to the embodiment in FIG. 5. Details are not described herein again.

Figure 12:
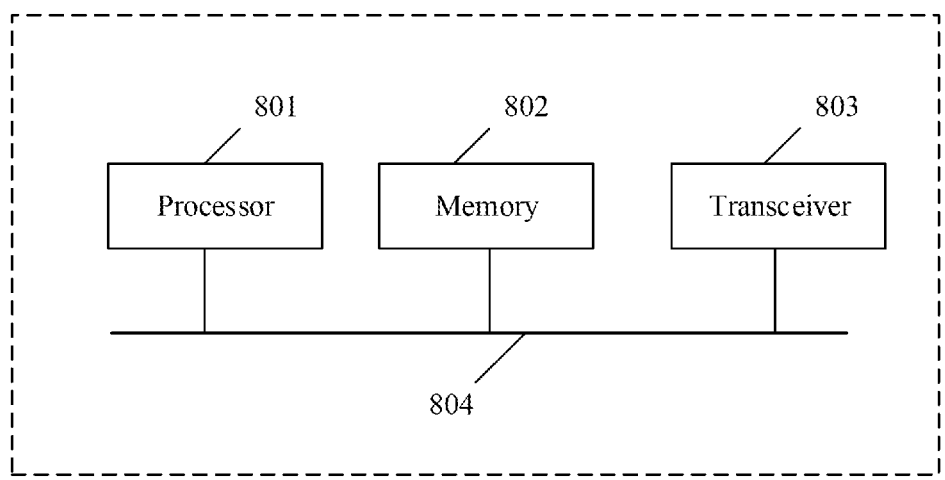
FIG. 12 is a schematic diagram of another embodiment of an application instance address translation apparatus according to an embodiment of this application.

Referring to FIG. 12, the apparatus described in the embodiments in FIG. 7 to FIG. 11 further provides an embodiment in another form, including: a processor 801, a memory 802, and a transceiver 803. The processor 801, the memory 802, and the transceiver 803 are connected by using a bus 804. The transceiver 803 may include a transmitter and a receiver. The memory 802 stores a computer instruction. The processor 801 executes the computer instruction to implement a function of the application instance address translation method in the embodiment in FIG. 3 or FIG. 5. Various flexible design manners may be used for a specific implementation. For functions of parts, further refer to the method embodiment. This is not limited in this application.

All or some of the foregoing embodiments may be implemented by software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of this application.

What is claimed is:

1. An application instance address translation method, wherein the method comprises:
   receiving, by a control plane device from a mobile edge cloud control device, an address of a target application instance of an application service accessed by a terminal;
   sending, by the control plane device, the address of the target application instance to a first user plane device; and
   instructing, by the control plane device, the first user plane device to set, as the address of the target application instance, a destination address of an uplink packet that is of the terminal and is associated with the application service.

2. The method according to claim 1, wherein the method further comprises:
   obtaining, by the control plane device, an address of an initial application instance used when the terminal initially accessed the application service; and
   instructing, by the control plane device, the first user plane device to set, as the address of the initial application instance, a source address of a downlink packet that is of the terminal and is associated with the application service.

3. The method according to claim 1, wherein the method further comprises:
   receiving, by the control plane device from the mobile edge cloud control device, an address of a source application instance of the application service; and
   instructing, by the control plane device, the first user plane device to set, as the address of the source application instance, a source address of a downlink packet that is of the terminal and is associated with the application service.

4. The method according to claim 1, wherein the method further comprises:
   sending, by the control plane device to the mobile edge cloud control device, location information of the terminal and information about the application service, wherein the location information and the information about the application service are for determination of the target application instance.

5. The method according to claim 4, wherein the location information of the terminal comprises at least one of: information about a target access network serving the terminal, information about a tracking area in which the terminal is located, information about a target user plane for the terminal, information about a target mobile edge cloud host for the terminal, or information about a target mobile edge cloud platform for the terminal.

6. The method according to claim 4, wherein the information about the application service comprises an identifier of the application service.

7. The method according to claim 1, wherein the method further comprises:
   sending, by the control plane device to the mobile edge cloud control device, at least one piece of user plane information;
   receiving, by the control plane device from the mobile edge cloud control device, first user plane information, wherein the first user plane information is among the at least one piece of user plane information; and
   determining, by the control plane device, the first user plane device according to the first user plane information.

8. The method according to claim 7, wherein the method further comprises:
   receiving, by the control plane device, a handover request for requesting to hand over the terminal from an original access network to a target access network;
   selecting, by the control plane device based on the target access network, at least one user plane device corresponding to the target access network; and
   after the control plane device determines the first user plane device, creating, by the control plane device, a session between the terminal and the first user plane device.

9. The method according to claim 1, wherein the target application instance provides the application service, and wherein a service location range of the target application instance comprises a location of the terminal.

10. An application instance address translation method, wherein the method comprises:
- determining, by a mobile edge cloud control device, a target application instance of an application service accessed by a terminal;
- obtaining, by the mobile edge cloud control device, an address of the target application instance;
- sending, by the mobile edge cloud control device, the address of the target application instance to a control plane device;
- sending, by the control plane device, the address of the target application instance to a first user plane device; and
- instructing, by the control plane device, the first user plane device to set, as the address of the target application instance, a destination address of an uplink packet that is of the terminal and is associated with the application service.

11. The method according to claim 10, wherein the method further comprises:
- sending, by the control plane device, location information of the terminal and information about the application service to the mobile edge cloud control device, wherein determining the target application instance comprises determining the target application instance based on the location information and the information about the application service.

12. The method according to claim 10, wherein the method further comprises:
- obtaining, by the control plane device, an address of an initial application instance used when the terminal initially accessed the application service; and
- instructing, by the control plane device, the first user plane device to set, as the address of the initial application instance, a source address of a downlink packet that is of the terminal and is associated with the application service.

13. The method according to claim 10, wherein the method further comprises:
- receiving, by the control plane device from the mobile edge cloud control device, an address of a source application instance of the application service; and
- instructing, by the control plane device, the first user plane device to set, as the address of the source application instance, a source address of a downlink packet that is of the terminal and is associated with the application service.

14. The method according to claim 10, wherein the method further comprises:
- sending, by the control plane device, at least one piece of user plane information to the mobile edge cloud control device;
- receiving, by the control plane device, first user plane information from the mobile edge cloud control device, wherein the first user plane information is among the at least one piece of user plane information; and
- determining, by the control plane device, the first user plane device according to the first user plane information.

15. An application instance address translation apparatus, wherein the apparatus comprises:
- a receiver;
- a transmitter;
- at least one processor; and
- one or more memories coupled to the at least one processor and storing programming instructions for execution by the at least one processor to:
  - receive, by the receiver, an address of a target application instance of an application service accessed by a terminal from a mobile edge cloud control device;
  - send, by the transmitter, the address of the target application instance to a first user plane device; and
  - instruct, via the transmitter, the first user plane device to set, as the address of the target application instance, a destination address of an uplink packet that is of the terminal and is associated with the application service.

16. The apparatus according to claim 15, wherein the programming instructions are for execution by the at least one processor to send, by the transmitter, location information of the terminal and information about the application service to the mobile edge cloud control device, wherein the location information and the information about the application service are for determination of the target application instance.

17. The apparatus according to claim 15, wherein the programming instructions are for execution by the at least one processor to:
- obtain an address of an initial application instance used when the terminal initially accessed the application service; and
- instruct, via the transmitter, the first user plane device to set, as the address of the initial application instance, a source address of a downlink packet that is of the terminal and is associated with the application service.

18. The apparatus according to claim 15, wherein the programming instructions are for execution by the at least one processor to:
- receive, by the receiver, an address of a source application instance of the application service from the mobile edge cloud control device; and
- instruct, via the transmitter, the first user plane device to set, as the address of the source application instance, a source address of a downlink packet that is of the terminal and is associated with the application service.

19. The apparatus according to claim 15, wherein the programming instructions are for execution by the at least one processor to:
- send at least one piece of user plane information to the mobile edge cloud control device;
- receive first user plane information from the mobile edge cloud control device, wherein the first user plane information is among the at least one piece of user plane information; and
- determine the first user plane device according to the first user plane information.

20. The apparatus according to claim 15, wherein the target application instance provides the application service, and wherein a service location range of the target application instance comprises a location of the terminal.

* * * * *